United States Patent
Aalto et al.

[11] Patent Number: 5,829,464
[45] Date of Patent: Nov. 3, 1998

[54] REGULATION DEVICE AND METHOD FOR REGULATION OF AN AIR FLOW

[75] Inventors: Arvo Aalto; Raimo Parkkila, both of Kausala; Jouni Laurikainen, Kouvola; Andrei Livtchak, Kausala, all of Finland

[73] Assignee: Halton Oy, Kausala, Finland

[21] Appl. No.: 825,692

[22] Filed: Apr. 2, 1997

[30] Foreign Application Priority Data

Apr. 2, 1996 [FI] Finland ..................................... 961481

[51] Int. Cl.⁶ ..................................................... F16K 3/03
[52] U.S. Cl. ................................................. 137/1; 251/212
[58] Field of Search ................................. 251/212; 137/1

[56] References Cited

U.S. PATENT DOCUMENTS

| | | |
|---|---|---|
| 2,094,707 | 10/1937 | Jones .................................. 251/212 X |
| 2,934,966 | 5/1960 | Wood . |
| 4,095,514 | 6/1978 | Roy et al. ........................... 251/212 X |
| 4,163,726 | 8/1979 | Wilson et al. ...................... 251/212 X |
| 4,190,085 | 2/1980 | Hasa et al. . |
| 5,449,141 | 9/1995 | Gillett et al. . |

FOREIGN PATENT DOCUMENTS 451034 8/1987 Sweden .

*Primary Examiner*—Kevin Lee
*Attorney, Agent, or Firm*—Steinberg & Raskin, P.C.

[57] ABSTRACT

A regulation device and method for regulating an air flow, a gas flow or an equivalent medium flow in which slats can be moved to form an adjustable flow passage in their interior and have lateral edges overlapping each other. The cross-sectional flow area of the flow passage defined by the slats in their interior is adjustable by displacing the slats. A wire is passed around the slats and is displaceable so as to displace the slats and thus regulate the flow passing through the flow passage defined by the slats.

23 Claims, 2 Drawing Sheets

REGULATION DEVICE AND METHOD FOR REGULATION OF AN AIR FLOW

FIELD OF THE INVENTION

The present invention relates to a device for regulating an air flow and a method for regulating an air flow.

BACKGROUND OF THE INVENTION

In the prior art, there is a so-called iris regulator construction in which regulation plates or slats in the regulator can be installed as a single bundle of slat plates, which form a circular structure in one position, in the interior of a pipe, duct, valve body or other equivalent structure through which a flow of air, gas or another medium passes. By displacing the bundle of slat plates as a single structural unit from the circular position and by acting upon the slat plate construction by means of a separate displacing spindle arranged in the interior of the pipe, it is possible to regulate the sectional flow of the semi-conically shaped structure thus formed.

OBJECTS AND SUMMARY OF THE INVENTION

It is an object of the present invention to provide an improvement for the regulation device construction mentioned above.

It is another object of the present invention to provide a new and improved regulation device and method for regulating an air flow in a pipe, duct, valve body and other equivalent flow structures.

In order to achieve these objects and others, in the regulation device in accordance with the invention, the basic structure of the iris regulator described above is incorporated with a separate wire which is fitted around the semi-conical or circular bundle of slat plates. The unit of slat plates is displaced by acting upon this wire from outside the valve construction or the duct in connection with which the regulator is associated. Thus, the present invention provides a simple and advantageous mechanism for displacement of the unit of slat plates for an iris regulator such as described above.

In one particular embodiment, the device includes a plurality of slats arranged to form a circle and define a circular passage for the flow, the slats having lateral edges overlapping one another and being movable to adjust the flow passage defined thereby. The device includes a wire passing around the slats, and displacement means for displacing the wire to move the slats to thereby regulate the flow passing through the flow passage defined by the slats. One or more of the slats should include a guide opening through which the wire passes, e.g., formed from an integral portion of the slat, whereby the wire passes freely through the guide opening. The slat may also include a bracket containing the guide opening, in which case, the bracket and slat are formed out of a common slat plate, the bracket being formed by bending a portion of the slat plate at a longitudinal edge of the slat plate relative to a planar portion of the slat plate.

In other words, the air flow regulation device in accordance with the invention, which may be used in the method in accordance with the invention, comprises a wire which is passed around the structure consisting of the slats and in which structure, the wire can be displaced so as to displace the slats and thus regulate the flow passing through the structure consisting of the slats.

In other words, the slat structure has a plurality of slats having lateral edges overlapping one another to form a circle and a first position in which the slats define a circular passage for the flow and a second position in which the slats close the flow passage. As such, the wire passes around the slats, and the device includes displacement means for displacing the wire to move the slat structure to the first position, the second position or an intermediate position between the first and second positions to thereby regulate the flow passing through the flow passage defined by the slats in the slat structure.

In the method in accordance with the invention for regulating an air or gas flow, the slats are displaced by means of a wire, wire cable or equivalent which has been passed in the form of a loop around the slat structure, in which connection the regulation of the air flow, gas flow or equivalent takes place upon displacement of the wire. More particularly, in one embodiment, a slat structure having a plurality of slats is arranged in a duct or valve body through which the flow passes, the slats defining a passage for the flow, the wire is passed in a loop around the slats, and the wire is displaced to move the slats in order to adjust the cross-sectional area of the flow passage and thus regulate the flow passing through the flow passage. The slat structure has a first position in which the slats define a circular passage for the flow and a second position in which the slats close the flow passage, the wire being displaceable to move the slat structure to an intermediate position between the first and second positions in which the slats are in a semi-conical formation. Also, the wire may be passed through a guide hole on one or more of the slats.

The invention will be described in the following with reference to some preferred embodiments of the invention illustrated in the figures in the accompanying drawings. However, the invention is not confined to the illustrated embodiments alone.

BRIEF DESCRIPTION OF THE DRAWINGS

Additional objects of the invention will be apparent from the following description of the preferred embodiment thereof taken in conjunction with the accompanying non-limiting drawings, in which.

DETAILED DESCRIPTION OF THE PREFERRED EMBODIMENTS

Figure 1:
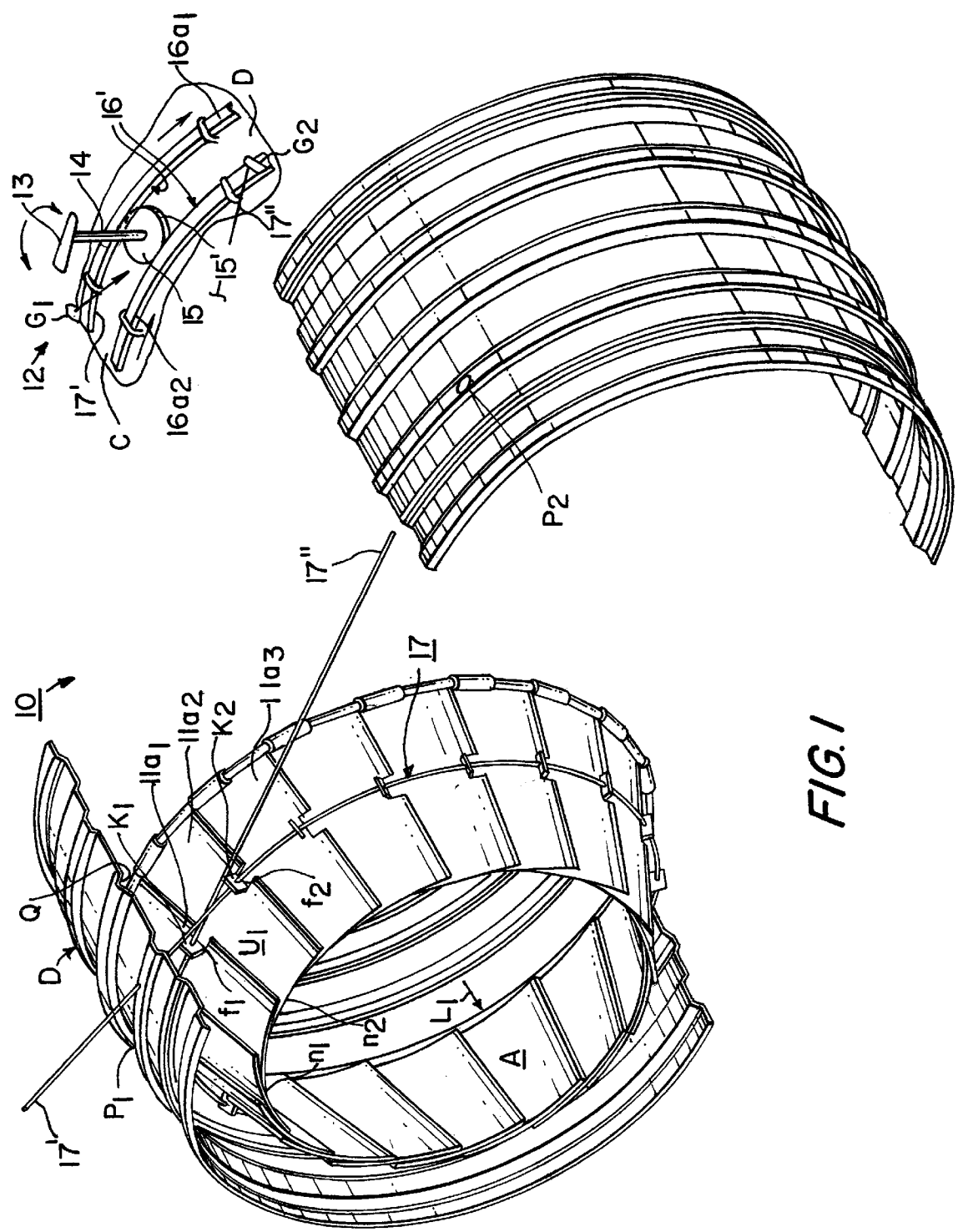
FIG. 1 is an exploded perspective view of a device for regulation of an air flow in accordance with the invention, and which can be used in the method in accordance with the invention, in which the regulation mechanism connected with the displacing wire in the regulation device is shown, for the purpose of clarity of illustration, as taken apart from the rest of the construction, and similarly, for the sake of clarity of illustration, the duct is shown as two separate parts in order to illustrate the construction of the bundle of slats.
Figure 3:
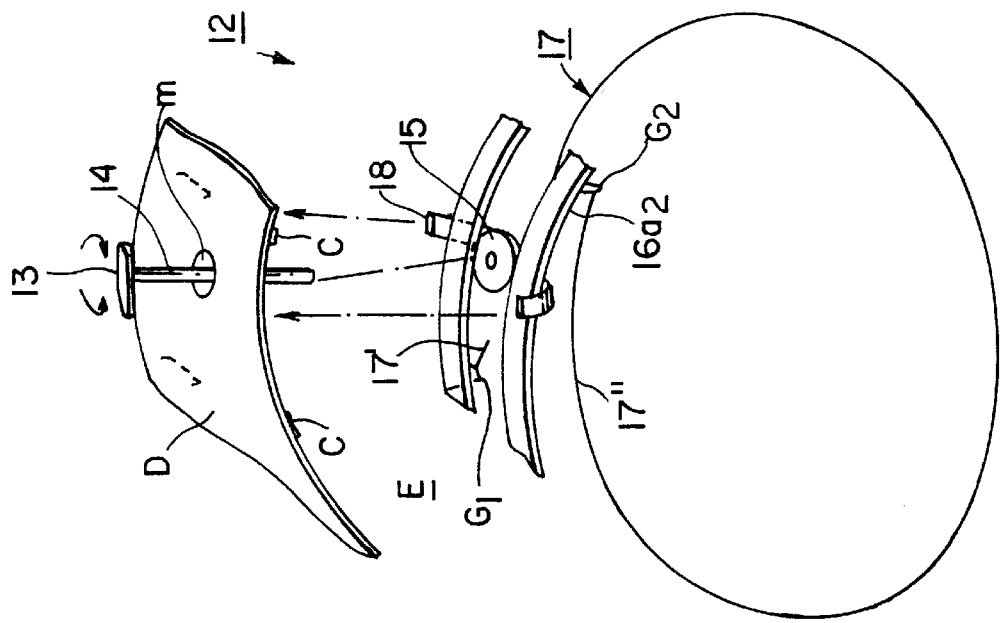
FIG. 3 shows an embodiment of the regulation mechanism in which the regulation mechanism is arranged in the interior of the duct or equivalent, whereby the spindle and the regulation knob of the regulation mechanism are placed outside the duct or equivalent.
Figure 2:
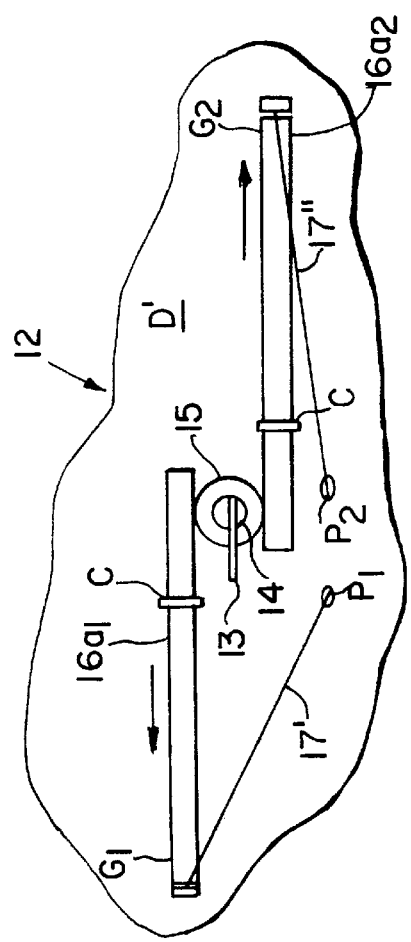
FIG. 2 shows the regulation mechanism as a construction unit connected with the outer face of a duct.

Referring to FIGS. 1–3 wherein like reference numerals refer to the same or similar elements, FIG. 1 shows an air flow regulation device 10 in accordance with the invention. The regulation device 10 comprises separate slats $11a_1$, $11a_2$, . . . , which are arranged in a fan shape so that their lateral edges are placed partly one above the other, i.e., overlapping each other whereby a first lateral edge of each flap is able to operatively overlie a second lateral edge of an adjacent flap. When the regulation device 10 is positioned in a flow duct D, it can be adjusted to an open position, in which the slats have an overall circular form and define a circular flow passage, and a closed position, in which there is a reduced or nonexistent flow through the regulation device, and to different regulation positions between the open and closed positions. Thus, when the regulator 10 is in the fully open position, the face planes U of the slats $11a_1$, $11a_2$, ... are substantially parallel to the plane of the face of the flow duct D, pipe or equivalent, in which case the resistance to air flow produced by the slats is at a minimum and the cross sectional flow area of a central flow passage A between the slats is at a maximum, i.e., a complete circular space. When the flow is throttled by means of the regulation device 10, the slats $11a_1$, $11a_2$, $11a_3$, ..., $11a_n$, i.e., the air flow throttle parts, are displaced so that they form a semi-conically narrowing structure and a corresponding semi-conically narrowing flow passage A between them. In this passage, the flow opening/cross-sectional flow area at the end of the semi-conical structure is regulated depending on the regulation position.

In accordance with the invention, the displacement of the slats $11a_1$, $11a_2$, ... takes place from outside the duct D, or the valve body pipe if the regulation device 10 is situated in the same, by means of a separate regulation mechanism 12, which is also called a displacing mechanism.

The regulation mechanism 12 shown in FIG. 1 is placed outside the duct D or valve body pipe. The regulation mechanism 12 comprises a turning part 13, preferably a turning knob, which is coupled to a spindle 14 provided with an associated drive wheel 15. The drive wheel 15 is preferably a gear wheel, and it is coupled at one side with one displaceable member or band $16a_1$, arranged along the pipe D or equivalent and at an opposite side with another displaceable member or band $16a_2$ arranged along the outer face of the pipe D. When the spindle 14 is rotated, the drive wheel 15 connected with the spindle is rotated and, further, the corresponding parts connected with the drive wheel 15, i.e., the bands $16a_1, 16a_2$, are displaced in opposite directions. A wire 17 is connected to the bands $16a_1$, $16a_2$, which wire is a wire cable or equivalent made of a favorable, rigid material, and passed in a loop around the slats $11a_1$, $11a_2$, ... which are fitted circumferentially, i.e., in a circular orientation. One end 17' of the wire 17 is coupled with a bracket $G_1$ on the band $16a_1$, and the opposed end 17" of the wire 17 is coupled with a bracket $G_2$ on the band $16a_2$. Thus, when the spindle 14 is rotated, the bands $16a_1, 16a_2$ are displaced in opposite directions and, further, the ends 17',17" of the wire 17 connected to them, respectively, are displaced in the direction of the circumference of the circular form of the slats, but in opposite directions. Then, the wire 17, which is structured to form a loop around the slat plate structure, i.e., the slat package 11, is affected, and by means of the wire, the slats $11a_1$, $11a_2$, ... whose longitudinal edges $n_1, n_2$, ... are placed overlapping each other are affected while the wire 17 is connected displaceably with a number of different slats $11a_1$, $11a_2$, ... evenly around the entire length of the circular section of the structure. Preferably, a portion of at least one slat 11 projects from the side face or plane U thereof and includes a respective through $f_n$. For example, in at least one and preferably a few slats $11a_1$, $11a_2$, ..., a respective plate bracket $K_1, K_2$, ... is employed and includes a respective through hole $f_1, f_2$. ... through which the wire 17 is passed as freely running. The wire 17 has a rigid structure, and therefore it can transfer the force arising from the turning of the spindle 14 over the entire slat plate construction 11, i.e., the slat package, in which connection, when the spindle 14 is rotated, either the air flow $L_1$, is throttled and the slats are placed into a semi-conical formation, or the throttle is reduced, in which connection, in an extreme case, the planes of the slats $11a_1$, $11a_2$, ... are placed parallel to the face of the pipe D or equivalent, in which case the slats produce almost no throttle in the air flow $L_1$.

FIG. 2 is a separate illustration showing the construction of the regulation/displacing mechanism 12 arranged on the outer face D' of the duct D, pipe or equivalent. The regulating/displacing mechanism 12 is arranged on the outer face of the duct D. The mechanism 12 comprises the turning part or turning knob 13, which is coupled with the spindle 14 which in turn is connected with the drive wheel 15.

The drive wheel 15 preferably includes a toothing 15' (FIG. 1), which is in engagement with the bands $16a_1$, and $16a_2$ arranged circumferentially outside the duct D, at opposite sides of the wheel 15. Thus, when the wheel 15 is rotated, the bands $16a_1$, $16a_2$ are displaced in opposite directions. Further, the bands $16a_1$, $16a_2$ are guided displaceably by guide means such as holders C or equivalent structures. The bands $16a_1$, $16a_2$ are preferably also provided with toothings 16', which cooperate with and are in engagement with the toothing 15' on the drive wheel 15. The bands $16a_1$, $16a_2$ are fixedly connected with the wire 17 from the wire ends 17',17". More particularly, the ends 17',17" of the wire 17 are fixedly coupled with the brackets $G_1, G_2$ on the bands $16a_1$, $16a_2$. The wire 17 is passed through openings $P_1, P_2$ on the duct D, valve pipe or equivalent into the interior E of the duct D or equivalent as loop-shaped around the bundle 11 of slats of what is called an "iris regulator".

The wire 17 is placed between outer faces $U_1$ of the slats $11a_1$, $11a_2$, ... and the pipe D or an equivalent structure and is guided through the guide opening $f_1, f_2$. ... of the respective bracket $K_1, K_2$. ... formed or arranged on one or more of the slats $11a_1, 11a_2, \ldots$. The brackets $K_1, K_2, \ldots$ are preferably formed out of the same slat plate structure as the slats $11a_1$, $11a_2$, ..., i.e., a common slat plate, by bending a tongue $K_1, K_2$ ... out of the area of one longitudinal edge of the slat $11a_1$, $11a_2$ ..., upward relative to a planar portion of the common slat plate from which the slat and bracket are formed. The wire 17 guiding is arranged preferably as uniformly spaced around the circumferential length of the slat structure. The number of such guiding points can be, for example, three points $f_1, f_2, f_3$, which are arranged with a spacing of about 120°. Other numbers of guiding points can be provided with a uniform angular spacing therebetween.

The regulation device in accordance with the invention can comprise a pipe D included in the assembly. In such a case, the regulation device is coupled to the rest of the pipe system as a separate structural component that includes the pipe D. The regulation device in accordance with the invention comprises the slats, and their mechanism of displacement can also be installed as such into a separate pipe, into an inner annular groove Q in the pipe. In such a case, just a through hole is made into the pipe D wall for the regulation spindle 14.

FIG. 3 illustrates an embodiment of the invention in which the mechanism 12 of displacement of the slats $11a_1$, $11a_2$, ... is arranged in the interior of the pipe D, valve body or equivalent.

The construction shown in FIG. 3 is similar to that in the embodiment shown in FIG. 2, but the mechanism 12 is placed inside the pipe D. The spindle 14 is passed through a lead-in opening m through the pipe D, valve housing or an equivalent structure into the interior space E of the pipe D or the valve body, and in the interior space E there is a holder 18 in which the spindle 14 end with the connected drive wheel 15 is arranged. The bands $16a_1$, $16a_2$, with which the drive wheel 15 is connected operationally, are arranged along the inner face of the pipe D. The bands are movable and guided by guide means such as separate holders C. The holders C are fixed to the pipe D. The ends 17',17" of the wire 17 are coupled with the brackets $G_1$ and $G_2$ on the bands $16a_1$, $16a_2$.

The examples provided above are not meant to be exclusive. Many other variations of the present invention would be obvious to those skilled in the art, and are contemplated to be within the scope of the appended claims.

We claim:

1. In a regulation device for regulating an air flow, a gas flow or other medium flow, including a plurality of slats arranged to form a circle and define a circular passage for the flow, said slats having edges overlapping one another and being movable to adjust the flow passage defined by said slats, the improvement comprising:

a wire passing around at least a portion of said slats, at least one of said slats of said portion of said slats having a side face and a portion projecting from said side face, said projecting portion including a through hole through which said wire passes freely such that said wire is not fixedly connected to said at least one slat, and displacement means for displacing said wire to move said slats to thereby regulate the flow passing through the flow passage defined by said slats, said displacement means being arranged to displace said wire to alternatively reduce the flow passage and increase the flow passage.

2. The regulation device of claim 1, wherein said wire is rigid and made of metal.

3. The regulation device of claim 1, wherein said projecting portion is formed integral with said at least one slat.

4. The regulation device of claim 1, wherein said projecting portion of said at least one slat comprises a bracket, said bracket and said at least one slat being formed out of a common slat plate, said bracket being formed by bending a portion of said slat plate at a longitudinal edge of said slat plate relative to a planar portion of said slat plate.

5. The regulation device of claim 4, wherein said at least one slat comprises a plurality of slats uniformly spaced over the circular formation of said slats.

6. The regulation device of claim 1, wherein said displacement means comprise a regulation part, a rotatable spindle coupled to said regulation part, a drive wheel coupled to said spindle, a first displaceable member arranged on one side of said drive wheel and engaging with said drive wheel, and a second displaceable member arranged on an opposite side of said drive wheel and engaging with said drive wheel, said wire having first and second ends, said first end of said wire being fixedly coupled to said first displaceable member and said second end of said wire being fixedly coupled to said second displaceable member such that upon rotation of said regulation part, said spindle and said drive wheel rotate and move said first and second displaceable members in opposite directions and thus said first and second ends of said wire are displaced in opposite directions.

7. The regulation device of claim 6, wherein the regulation device is arranged in a pipe or duct, said regulation part being arranged outside said pipe or duct, and said spindle extending from outside of said pipe or duct to an interior of said pipe or duct, said drive wheel and said first and second displaceable members being attached to the interior of said pipe or duct.

8. The regulation device of claim 6, further comprising a bracket arranged in connection with each of said first and second displaceable members, said first and second ends of said wire being fixed to a respective one of said brackets.

9. The regulation device of claim 6, further comprising guide means for guiding the displacement of said first and second displaceable members.

10. The regulation device of claim 1, wherein the regulation device is arranged in a pipe or valve body, said displacement means being arranged outside said pipe or valve body such that only a loop of said wire passes into an interior of said pipe or valve body, said wire having first and second ends situated outside said pipe or valve body.

11. The device of claim 1, wherein each of said slats has a first lateral edge and a second lateral edge, said slats being arranged such that said first lateral edge of each of said slats overlies said second lateral edge of an adjacent one of said slats.

12. In a regulation device for regulating an air flow, a gas flow or other medium flow, including a slat structure having a plurality of slats having edges overlapping one another to form a circle, said slat structure having a first position in which said slats define a circular passage for the flow and a second position in which said slats close the flow passage, the improvement comprising:

a wire passing around at least a portion of said slats, at least one of said slats of said portion of said slats having a side face and a portion projecting from said side face, said projecting portion including a through hole through which said wire passes freely such that said wire is not fixedly connected to said at least one slat, and displacement means for displacing said wire to move said slat structure to said first position, said second position or an intermediate position between said first and second positions to thereby regulate the flow passing through the flow passage defined by said slats in said slat structure, said displacement means being arranged to displace said wire to alternatively reduce the flow passage and increase the flow passage.

13. The regulation device of claim 12, wherein said projecting portion of said at least one slat comprises a bracket, said bracket and said at least one slat being formed out of a common slat plate, said bracket being formed by bending a portion of said slat plate at a longitudinal edge of said slat plate relative to a planar portion of said slat plate.

14. The regulation device of claim 12, wherein said displacement means comprise a regulation part, a rotatable spindle coupled to said regulation part, a drive wheel coupled to said spindle, a first displaceable member arranged on one side of said drive wheel and engaging with said drive wheel, and a second displaceable member arranged on an opposite side of said drive wheel and engaging with said drive wheel, said wire having first and second ends, said first end of said wire being fixedly coupled to said first displaceable member and said second end of said wire being fixedly coupled to said second displaceable member such that upon rotation of said regulation part, said spindle and said drive wheel rotate and move said first and second displaceable members in opposite directions and thus said first and second ends of said wire are displaced in opposite directions.

15. The regulation device of claim 14, wherein the regulation device is arranged in a pipe or duct, said slat structure being arranged within an interior of said pipe or duct and said regulation part being arranged outside said pipe or duct, said spindle extending from outside of said pipe or duct to the interior of said pipe or duct, said drive wheel and said first and second displaceable members being attached to the interior of said pipe or duct.

16. The regulation device of claim 12, wherein the regulation device is arranged in a pipe or valve body, said slat structure being arranged within an interior of said pipe or valve body, said displacement means being arranged outside said pipe or valve body such that only a loop of said wire passes into the interior of said pipe or valve body, said wire having first and second ends are situated outside said pipe or valve body.

17. A method for regulating an air flow or gas flow, comprising the steps of:

arranging a slat structure having a plurality of slats in a duct or valve body through which the flow passes, said slats defining a passage for the flow, providing at least one of said slats with a portion projecting from a side face of said at least one slat, arranging a through hole in said projecting portion of said at least one slat, passing a wire around at least a portion of said slats and freely through said through hole in said at least one slat such that said wire is not fixedly connected to said at least one slat, and displacing said wire to move said slats in order to alternatively reduce and increase the cross-sectional area of said passage and thus regulate the flow passing through said passage.

18. The method of claim 17, wherein said slat structure has a first position in which the passage defined by said slats is circular and a second position in which the passage defined by said slats is closed, said wire being displaceable to move said slat structure to an intermediate position between said first and second positions in which said slats are in a semi-conical formation.

19. In a regulation device for regulating an air flow, a gas flow or other medium flow, including a plurality of slats arranged to form a circle and define a circular passage for the flow, said slats having lateral edges overlapping one another and being movable to adjust the flow passage defined by said slats, the improvement comprising a wire passing around at least a portion of said slats, at least one of said slats of said portion of slats includes a guide opening through which said wire passes, said at least one slat including a bracket containing said guide opening, said bracket and said at least one slat being formed out of a common slat plate, said bracket being formed by bending a portion of said slat plate at a longitudinal edge of said slat plate relative to a planar portion of said slat plate, and displacement means for displacing said wire to move said slats to thereby regulate the flow passing through the flow passage defined by said slats.

20. In a regulation device for regulating an air flow, a gas flow or other medium flow, including a plurality of slats arranged to form a circle and define a circular passage for the flow, said slats having lateral edges overlapping one another and being movable to adjust the flow passage defined by said slats, the improvement comprising a wire passing around at least a portion of said slats, and displacement means for displacing said wire to move said slats to thereby regulate the flow passing through the flow passage defined by said slats, said displacement means comprising a regulation part, a rotatable spindle coupled to said regulation part, a drive wheel coupled to said spindle, a first displaceable member arranged on one side of said drive wheel and engaging with said drive wheel, and a second displaceable member arranged on an opposite side of said drive wheel and engaging with said drive wheel, said wire having first and second ends, said first end of said wire being fixedly coupled to said first displaceable member and said second end of said wire being fixedly coupled to said second displaceable member such that upon rotation of said regulation part, said spindle and said drive wheel rotate and move said first and second displaceable members in opposite directions and thus said first and second ends of said wire are displaced in opposite directions.

21. The regulation device of claim 20, wherein the regulation device is arranged in a pipe or duct, said regulation part being arranged outside said pipe or duct, and said spindle extending from outside of said pipe or duct to an interior of said pipe or duct, said drive wheel and said first and second displaceable members being attached to the interior of said pipe or duct.

22. The regulation device of claim 20, further comprising a bracket arranged in connection with each of said first and second displaceable members, said first and second ends of said wire being fixed to a respective one of said brackets.

23. The regulation device of claim 20, further comprising guide means for guiding the displacement of said first and second displaceable members.

* * * * *